July 19, 1960 A. J. GELLES 2,946,009
CONTROL APPARATUS
Filed Sept. 9, 1957
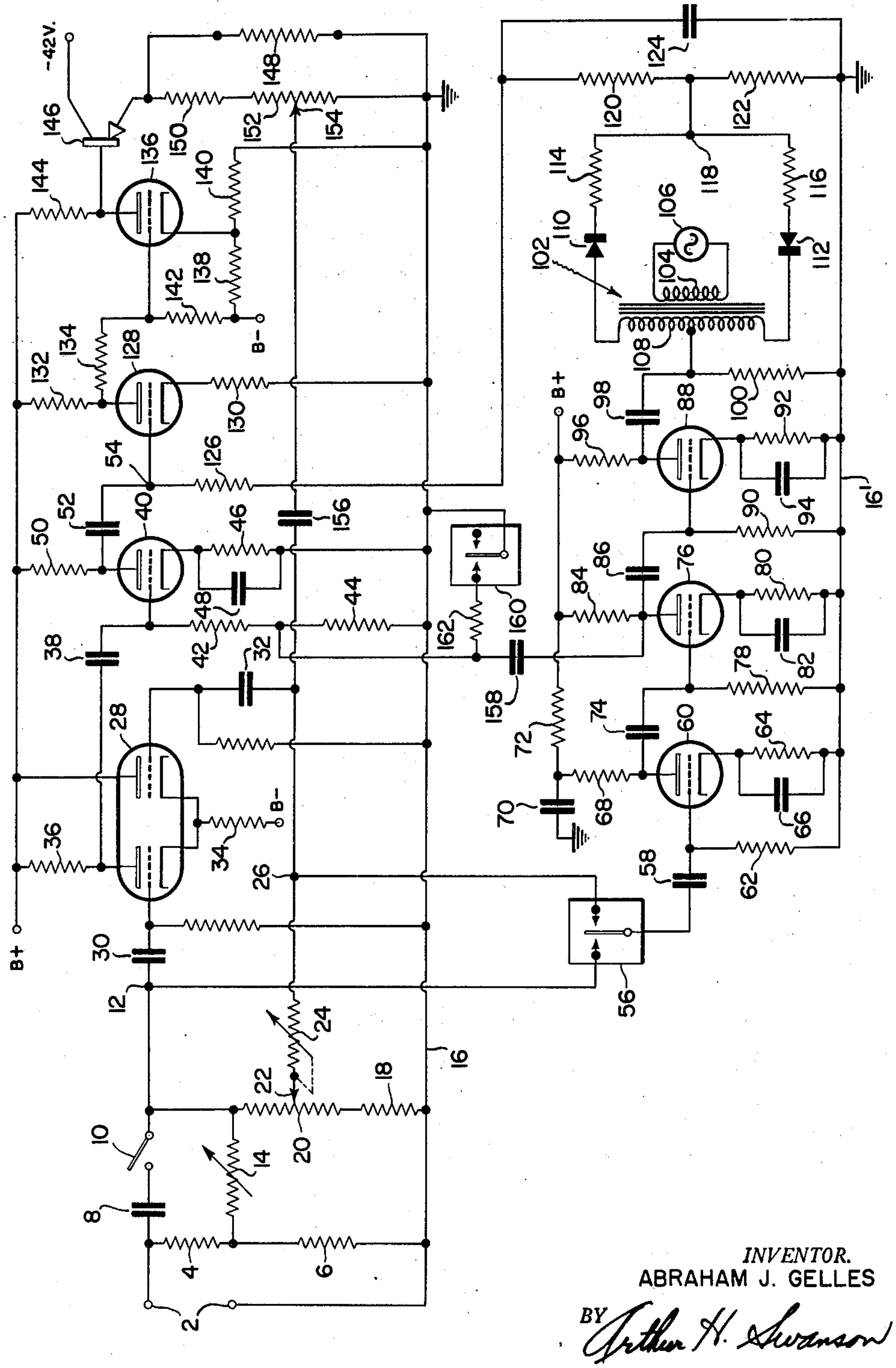
INVENTOR.
ABRAHAM J. GELLES
BY Arthur H. Swanson
ATTORNEY.

2,946,009
Patented July 19, 1960

2,946,009

CONTROL APPARATUS

Abraham J. Gelles, Philadelphia, Pa., assignor to Minneapolis-Honeywell Regulator Company, Minneapolis, Minn., a corporation of Delaware Filed Sept. 9, 1957, Ser. No. 682,842

5 Claims. (Cl. 328—71)

This invention relates to electronic control apparatus, and more particularly to an improved electronic controller for controlling a process in response to very small direct current signals.

In the art of automatic instrumentation it has been found desirable, on many occasions, to have means for controlling a system or process which means is entirely electrical in its operation. This is in contra distinction to the electrical controllers which are partially mechanical in their operation, providing means for balancing forces one against another. It is also desirable that such electrical controller include means providing rate, reset, and proportional band functions. It is also desirable that such a controller be capable of responding to rapid changes in input signal without sacrificing stability and accuracy. The prior art controllers have, for one reason or another, fallen short of these requirements.

It is, accordingly, an object of the present invention to provide an improved electronic controller which is free from mechanical force balancing members.

It is another object of this invention to provide an improved electronic controller as set forth and which includes electrical components for producing rate, reset and proportional band functions.

It is a further object of this invention to provide an improved electronic controller as set forth which is further characterized in its high response to rapid signal changes while at the same time maintaining a high degree of accuracy and stability.

In accomplishing these and other objects, there has been provided, in accordance with the present invention, an improved controller which includes a D.C. amplifier which has an electronic signal differentiator or rate circuit in its input circuit, a variable feedback circuit for proportional band control, and an electronic signal integrator for reset control. The amplifier features an RC coupled amplifier section which responds to rapid changes in the input signal and a chopper stabilized A.C. amplifier section which responds to the slower changes in the input signal, and a D.C. output section into which both of the other two sections feed.

A better understanding of this invention may be had from the following detailed description when read in connection with the accompanying drawing in which:

The single figure is a schematic circuit diagram of an electronic controller embodying the present invention.

Referring now to the drawing in more detail, there is shown a pair of input terminals 2 to which may be applied a deviation signal from a process indicating instrument. The deviation signal would be a direct current difference signal indicating a deviation of a process variable from a desired value or set-point. Across these terminals 2, there is connected a pair of resistors 4 and 6, respectively. The upper terminal is also connected to a rate capacitor 8 which, in turn, is connected, through a switch 10, to one terminal 12 of the input to the amplifier circuit. The junction between the resistors 4 and 6 is connected to a variable, rate determining resistor 14. The lower one of the terminals 2, as well as the lower end of the resistor 6, is connected to a ground bus 16. Between the ground bus 16 and the lead connecting the switch 10 to the amplifier input terminal 12, there is connected a fixed resistor 18 connected in series with a slide-wire resistor 20. The end of the rate resistor 14 remote from the junction between the resistors 4 and 6 is connected to the upper end of the slide-wire resistor 20. The slide-wire resistor has associated therewith a slider or movable tap 22 which is connected, through a variable resistor 24, to a second amplifier input terminal 26.

The amplifier comprises three distinct sections. The first of these sections is an R-C coupled high frequency amplifier which is responsive to rapid changes in the value of an input signal, such, for example, as a step-wave input. The next of the sections is a chopper stabilized amplifier section which is connected in parallel with the first mentioned section. Both of these sections are applied, at a summing junction, as inputs for the third section of the amplifier which comprises a direct coupled D.C. amplifier output section.

The first section of this amplifier includes a differentially connected double triode 28. One triode portion is coupled, through a coupling capacitor 30 to the first mentioned amplifier input terminal 12. The other triode portion is similarly coupled, through a coupling capacitor 32, to the other amplifier input terminal 26. The cathodes of both of the triode portions of the tube 28 are connected through a common cathode resistor 34 to a negative power supply. The anode of the second triode portion of the tube 28 is connected directly to a positive supply voltage while the anode of the first triode portion is connected to the positive supply through a load resistor 36. The output of this first stage is taken from the anode of the first triode portion and coupled, through a coupling capacitor 38, to the input of the next amplifier stage which includes a tube 40. A pair of resistors 42 and 44 are serially connected between the grid of the tube 40 and the ground bus 16. The cathode of the tube 40 is connected to the ground bus 16 through a cathode resistor 46, by-passed by a capacitor 48. A load resistor 50 connects the anode to the positive supply. A coupling capacitor 52 couples the output of the tube 40 to the summing junction 54.

Returning to the amplifier input, it may be seen that the second or chopper stabilized amplifier section is also connected to the input terminals 12 and 26. A signal chopper 56 is schematically shown as having a pair of fixed contacts and a movable blade which is movable, under the influence of a driving coil (not shown), between the two fixed contacts. One of the amplifier input terminals 12 is directly connected to one of the fixed contacts while the other terminal 26 is directly connected to the other of the fixed contacts. The movable contact of the chopper 56 is connected, through a coupling capacitor 58, to the input of an amplifier tube 60. A bias resistor 62 connects the grid of the tube 60 to a grounded bus 16′. The cathode of the tube 60 is connected to the grounded bus 16′ through a cathode resistor 64 which is, in turn, by-passed by a capacitor 66. The anode of the tube 60 is connected, through a load resistor 68, to the positive voltage supply. A capacitor 70 and a resistor 72 connected in the positive voltage supply line constitute a decoupling network to prevent interaction between the just described amplifier stage and subsequent stages. The output of the tube 60 is coupled, through a coupling capacitor 74, to the input of a next amplifier stage which is substantially the same as the preceding stage which includes a tube 76 having a grid bias resistor 78, a cathode resistor 80 by-passed to ground by a capacitor 82, an anode load resistor 84, and a coupling capacitor 86. The coupling capacitor 86 couples the output of the tube 76 to the input of the next subsequent stage which, again, is substantially the same as the preceding stage. This stage includes an amplifying tube 88 having a grid bias resistor 90, a cathode resistor 92 by-passed to ground by a capacitor 94, an anode load resistor 96 and a coupling capacitor 98. The output of this stage is applied, through the coupling capacitor 98, across an output resistor 100, to the input of a demodulator.

The demodulator comprises a transformer 102 having a primary winding 104 energized from a source 106 of alternating current which is of the same phase and frequency as that employed to actuate the movable contact of the chopper 56. The secondary 108 of the transformer is connected at its opposite ends to a pair of oppositely poled diode rectifiers 110 and 112, respectively. A pair of load resistors 114 and 116 couple the output of the two rectifiers, respectively, to a summing junction 118. This junction is connected, through a voltage divider including a pair of resistors 120 and 122, across a filter capacitor 124 and through a summing resistor 126 to the junction 54. At this junction the signal from the chopper stabilized amplifier section is superimposed on the signal from the R-C coupled amplifier section and fed to the input of the D.C. amplifier section.

This D.C. amplifier includes a first amplifier tube 128 the grid of which is connected directly to the junction 54. The cathode of the tube 128 is connected, through a cathode resistor 130, to the ground bus 16. The anode of this tube is connected, through a load resistor 132 to the positive voltage supply. A coupling resistor 134 is connected between the anode of the tube 128 and the grid of a driver amplifier tube 136. The cathode of the tube 136 is connected to the junction between a pair of resistors 138 and 140, serially connected between the grounded bus 16 and the negative voltage supply. A resistor 142 is connected between the negative voltage supply and the grid of the tube 136. A load resistor 144 connects the anode of the tube 136 to the positive voltage supply. The anode of the tube 136 is directly connected to the base electrode of a transistor power amplifier 146. The collector electrode of the transistor 146 is connected to a suitable low-voltage negative power supply here illustrated as being —42 volts. The emitter electrode of the transistor is connected through an output resistance network to the ground bus 16. This network includes an output load represented by the resistor 148 connected in parallel with a feed back impedance comprising a fixed resistor 150 and a feedback slide wire resistor 152 having a movable tap 154. The feedback impedance is connected, through the movable tap 154 and a reset capacitor 156, back to the amplifier input terminal 26. It may also be seen that there is provided a stabilizing feedback from the second stage of the chopper stabilized section of the amplifier to the input of the second stage of the R-C coupled amplifier section. This feedback loop includes a coupling capacitor 158 which is connected between the anode of the tube 76 and the junction between the resistors 42 and 44. A synchronous rectifier, which includes a vibrating reed chopper 160 and a resistor 162, is coupled to the feedback loop to demodulate the square wave signal to produce a stabilizing signal on the grid of the tube 40.

In operation, an input or deviation signal is applied to the input terminals and across the two resistors 4 and 6. Assuming that the switch 10 is closed, a sharp change in the input signal would produce an initial peak signal across the rate capacitor 8. This capacitor would then begin to charge through the fixed resistor 6 and the variable resistor 14 at a variable rate depending upon the setting of the resistor 14. This signal is applied to the amplifier input terminal 12, and thence to the input grid of the first section of the amplifier tube 28. The amplified output of the first section is applied to the input of the second stage amplifier 40 where the signal is again amplified. This amplified signal is capacity coupled to the summing junction 54 and from there to the input of the direct coupled amplifier section.

This section, being direct coupled, may faithfully respond to the rapid changes of the sharp signal peak. Since the final or power amplifier stage of this section is a transistor, the output voltage of the driver stage 136 must be of such a character as to be accommodated by the transistor 146. Accordingly, the resistors 134 and 142 constitute a voltage divider between the anode of the tube 128 and the negative voltage supply, which negative supply may be on the order of —200 v. Similarly the resistors 138 and 140 constitute a voltage divider between the negative supply and the grounded bus 16. The junction between the resistors 134 and 142 of the first voltage divider is connected to the grid of the driver tube 136 while the junction between the resistors 138 and 140 of the second voltage divider is connected to the cathode of the same tube. This arrangement permits the necessary bias voltages to be applied to the tube to insure proper operation while producing a signal at the anode thereof which is of a proper magnitude and sign to be applicable to the input of the transistor 146. In the illustrated example, the signal applied to the base electrode of the transistor may decrease to a value of —36 volts. The output of this amplifier is taken across the resistance network in the emitter circuit of the transistor 146. In this network, a portion of the signal voltage developed across the slide wire resistor 152 is tapped off, by the slider 154, and fed back to the input of the amplifier. This feedback signal is applied to the grid of the second triode portion of the tube 28. Changes in the magnitude of this signal correspondingly change the condition of the conductivity of that triode portion. This change in conductivity is reflected, through the common cathode connection, as negative feedback on the operation of the first triode portion of the tube 28. Being a negative feedback arrangement, therefore a gain control circuit, the slide wire 152 constitutes a proportional band adjustment.

It will be noted that the feedback path from the slide wire 152 to the input of the amplifier includes a capacitor 156. This capacitor operates in conjunction with the resistors 18, 20 and 24 to provide an integrating or reset action. Thus, under conditions of a sustained positive, for example, error signal, the capacitor 156 begins charging at a rate depending on the setting of the two variable resistors 20 and 24. The charging of this capacitor 156 reduces the negative feedback to the input of the amplifier. This, in turn, effectively increases the gain of the amplifier to permit a larger output signal which may be used to attempt to correct the condition which produced the deviation signal.

With the foregoing circuit configuration, it may be seen that the effective signal is the grid-to-grid differential voltage applied to the two grids of the differential amplifier tube 28. It may also be seen that the same differential voltage is applied to the two fixed contacts of the chopper 56. The movable contact of the chopper 56 is driven into engagement with first one then the other of these fixed contacts at a predetermined frequency which may be at the rate of 60 cycles per second, for example. This produces a series of square wave pulses on the input grid of the tube 60. When the process under control is operating at the desired level or set-point, the signals on the two fixed contacts will be equal, and the square wave pulses applied to the input of the tube 60 will all be of the same amplitude which is, in effect, no signal on the input to the tube 60. On the other hand, if there is a difference signal on the two fixed contacts then there will be produced on the input to the tube 60 a square wave whose amplitude and phase is a function of the magnitude of the difference voltage and the relative polarity of that difference. The signals applied to the tube 60 are amplified and fed to the input of the next stage of amplification, the tube 76. From the tube 76, the amplified signal is applied to the input of a third stage, tube 88, the output of which is applied to the demodulator. In the demodulator, the transformer 102 has an alternating signal applied to the primary 104. This alternating signal is of the same phase and frequency as the signal used to drive the chopper 56. In the absence of a signal applied to the secondary 108 of the transformer, the induced voltage thereon will be balanced. The signals passed by the diodes 110 and 112 will be equal and sum to zero at the junction 118. If, however, a signal is applied from the tube 88 to the center tap on the secondary 108, there will result an unbalancing of the signals appearing across the two diodes and which will result in a net voltage signal appearing at the junction 118. The magnitude of this net voltage signal will be dependent upon the amplitude of the output signal from the tube 88. The polarity of the net voltage signal will be dependent upon the phase of output signal from the tube 88 relative to the signal applied to the primary of the transformer 102.

The signal developed at the junction 118 is well filtered to produce a substantially D.C. signal which is applied to the summing junction 54. At this point, the signal from the chopper stabilized amplifier section is superimposed upon the signal from the R-C coupled amplifier section and both signals are applied to the input of the direct coupled amplifier section.

In the event of a sharp deviation signal being applied to the input of the amplifier terminals 12 and 26, the sharp front of the signal will appear at the output terminals substantially instantaneously through R-C coupled amplifier section and the direct coupled amplifier section. However, when the same signal is passed through the chopper stabilized amplifier section, due to the output filter on the demodulator, there will be a substantial time delay introduced. This belated application of the sharp signal front may tend to produce an undesirable disturbance in the operation of the circuit. Therefore, a stabilizing signal is taken from the anode of the tube 76, before the appreciable time delay has been introduced. The signal is demodulated in a synchronous demodulator which is illustrated as being a chopper 160 similar to the chopper 56. The chopper 160 has a grounded movable contact and shorts alternate half cycles to ground. The signal resulting from this arrangement is injected into the R-C coupled amplifier just ahead of the last stage. This arrangement provides a means of anticipating the possible disturbance in the circuit and for injection a correction signal to prevent the occurrence thereof.

Thus it may be seen that there has been provided an improved all electronic controller which is free from mechanical force balancing elements, which features three mode operation, and which provides rapid signal response characteristics while maintaining a high degree of accuracy and stability.

What is claimed is:

1. An electronic controller for producing a direct current control signal which is a function of a direct current input signal, said controller comprising, in combination, an input circuit, a signal differentiating means connected to said input circuit to produce a signal which is a function of the rate of change of the input signal, an amplifier having a pair of input terminals connected to said differentiating means, said amplifier including a first amplifier section connected to said input terminals, a second amplifier section connected to said terminals in parallel with said first section, and a third amplifier section connected to the output of both of said first and said second amplifier sections and constituting an output amplifier section, said first amplifier section being an R-C coupled amplifier responsive to rapid signal changes, said second section being a chopper-stabilized amplifier responsive to slow changes in signal and including a synchronous rectifier in its output, said third section being a direct coupled amplifier responsive to the output signals of said first and second sections, an output circuit connected to the output of said third section, and variable feedback means coupled between said output circuit and the input to said first mentioned amplifier to produce a proportional band adjustment of said controller.

2. An electronic controller for producing a direct current control signal which is a function of a direct current input signal, said controller comprising, in combination, an input circuit, an input signal differentiating means connected to said input circuit to produce a signal which is a function of the rate of change of the input signal, an amplifier having a pair of input terminals connected to said differentiating means, said amplifier including a first amplifier section connected to said input terminals, a second amplifier section connected to said terminals in parallel with said first section, and a third amplifier section connected to the output of both said first and said second amplifier section and constituting an output amplifier section, said first amplifier section being an R-C coupled amplifier responsive to rapid signal changes, said second section being a chopper-stabilized amplifier responsive to slow changes in signal and including a synchronous rectifier in its output, said third section being a direct coupled amplifier responsive to the output signals of said first and said second sections, an output circuit connected to the output of said third section, and variable feedback means coupled between said output circuit and the input to said first mentioned amplifier to produce a proportional band adjustment of said controller, said feedback means including integrating means for producing a reset function for said amplifier.

3. The invention as set forth in claim 2 wherein said integrating means includes a capacitor connected serially in said feedback and a variable resistor connected between said capacitor and ground.

4. The invention as set forth in claim 2 wherein said signal differentiating means comprises a capacitor serially connected between said input circuit and one of said amplifier input terminals and a variable resistor connected in shunt with said capacitor.

5. The invention as set forth in claim 4 characterized by the addition of switch means connected to said capacitor for selectively eliminating the differentiating action thereof, without disconnecting said input circuit from said amplifier.

References Cited in the file of this patent

UNITED STATES PATENTS

| | | |
|---|---|---|
| 2,759,135 | Albrecht et al. | Aug. 14, 1956 |
| 2,788,441 | Zimmerli | Apr. 9, 1957 |
| 2,801,298 | Mital | July 30, 1957 |